United States Patent
Takahashi et al.

(10) Patent No.: US 11,440,589 B2
(45) Date of Patent: Sep. 13, 2022

(54) SUBFRAME STRUCTURE

(71) Applicant: HONDA MOTOR CO., LTD., Tokyo (JP)

(72) Inventors: Hayato Takahashi, Wako (JP); Keisuke Takakuwa, Wako (JP); Masataka Hirano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 270 days.

(21) Appl. No.: 16/833,936

(22) Filed: Mar. 30, 2020

(65) Prior Publication Data

US 2020/0307697 A1 Oct. 1, 2020

(30) Foreign Application Priority Data

Mar. 29, 2019 (JP) .............................. JP2019-065306

(51) Int. Cl.
    *B62D 21/06* (2006.01)
    *B62D 5/04* (2006.01)

(52) U.S. Cl.
CPC ........... *B62D 21/06* (2013.01); *B62D 5/0403* (2013.01)

(58) Field of Classification Search
CPC .... B62D 21/06; B62D 5/0403; B62D 5/0409; B62D 5/0412; B62D 5/0415; B62D 5/0418; B62D 5/0421; B62D 5/0424; B62D 5/0427
USPC ........................................................ 296/204
See application file for complete search history.

(56) References Cited

U.S. PATENT DOCUMENTS

| | | | |
|---|---|---|---|
| 9,889,885 B2* | 2/2018 | Kondo | B62D 21/11 |
| 2002/0033594 A1 | 3/2002 | Yamamoto et al. | |
| 2013/0241186 A1* | 9/2013 | Shibaya | B62D 21/00 |
| | | | 280/781 |
| 2015/0075896 A1* | 3/2015 | Imanishi | B62D 21/11 |
| | | | 180/312 |

FOREIGN PATENT DOCUMENTS

| | | |
|---|---|---|
| CN | 207697812 U | 8/2018 |
| JP | 2002-087319 A | 3/2002 |
| JP | 2015-093516 A | 5/2015 |

(Continued)

OTHER PUBLICATIONS

Office Action received in corresponding CN application No. 202010210201.X dated Mar. 3, 2022 with English translation (13 pages).

(Continued)

*Primary Examiner* — Joseph D. Pape
(74) *Attorney, Agent, or Firm* — Rankin, Hill & Clark LLP

(57) ABSTRACT

A subframe structure includes: a left-right pair of extension members arranged below a power plant, arranged in a forward part of a vehicle, the left-right pair of extension members each extending in a vehicle front-rear direction and each having a rear end portion; and a rear member connected to the rear end portions of the pair of left-right extension members, the rear member extending in a vehicle width direction. The rear member has a rearward part in which a recessed portion recessed downward is formed. The rear member has an upper face on which a steering device is to be mounted and at least a portion of a motor of the steering device is to be placed in the recessed portion.

8 Claims, 13 Drawing Sheets

(56) References Cited

FOREIGN PATENT DOCUMENTS

| | | | |
|---|---|---|---|
| JP | 2016037171 | * | 3/2016 |
| KR | 20180056431 | * | 5/2018 |
| WO | 2019008747 A1 | | 1/2019 |

OTHER PUBLICATIONS

Office Action received in corresponding Japanese application No. 2019-065306 dated Mar. 15, 2022 with English translation (7 pages).

* cited by examiner

SUBFRAME STRUCTURE

CROSS-REFERENCE TO RELATED APPLICATIONS

The present application claim priority under 35 U.S.C. § 119 to Japanese Patent Application No. 2019-065306, filed Mar. 29, 2019, the disclosure of which is herein incorporated by reference in its entirety.

BACKGROUND OF THE INVENTION

1. Field of the Invention

The present invent ion relates to a structure of a subframe attached to a lower side of front side frames.

2. Description of Related Art

For example, PCT international patent application publication No. WO 2019/00874 discloses a subframe structure of a subframe including a rear member formed of a light metal and arranged in a rearward part of the subframe and extension members extending forward from the rear member.

According to the subframe structure disclosed in PCT international patent application publication No. WO 2019/008747, the subframe structure includes joining parts that joins the extension members and the rear member. The joining parts are not reinforced, and the extension members include weak portions. This structure is intended to cause the subframe to be bent at the weak portions upon receipt of a collision load from a vehicle forward part.

SUMMARY OF THE INVENTION

There is a case in which an electric power steering device is arranged on a rearward part of a rear member of a subframe. In a case of four-wheel drive vehicle, it is necessary to arrange an electric power steering device at a high position so that the transfer extending from the transmission passes below the electric power steering device. In a case of two-wheel drive vehicle, an electric power steering device is located at a position lower than that of a four-wheel drive vehicle, because there is no transfer.

Arranging the transfer in a simple manner such that the transfer passes above the electric power steering device results in the transfer being located at a relatively high position, leading to impairment in vehicle layout flexibility. In addition, as described above, as the subframe structure for arranging the electric power steering device differs between four-wheel drive vehicles and two-wheel drive vehicles, a subframe for four-wheel drive vehicles and a subframe for two-wheel drive vehicles are required separately, leading to an increase in the manufacturing cost.

The present invention has been made in view of the above-described circumstances and it is an object of the present invention to provide a subframe structure which can be commonly used irrespective of whether the vehicle is a four-wheel drive vehicle or a two-wheel drive vehicle.

To achieve the above-described object, a subframe structure of an embodiment according to the present invention includes: a left-right pair of extension members arranged below a power plant arranged in a forward part of a vehicle, the left-right pair of extension members each extending in a vehicle front-rear direction and each having a rear end portion; and a rear member connected to the rear end portions of the pair of left-right extension members, the rear member extending in a vehicle width direction. The rear member has a rearward part in which a recessed portion recessed downward is formed. The rear member has an upper face on which a steering device is to be mounted and at least a portion of a motor of the steering device is to be placed in the recessed portion.

The present invention is capable of providing a subframe structure that can be commonly used irrespective of whether the vehicle is four-wheel drive or two-wheel drive.

BRIEF DESCRIPTION OF THE DRAWINGS

FIG. 3 is a cross-sectional view of a motor placement recess, taken along line IX-IX of FIG. 4.

DETAILED DESCRIPTION OF THE EMBODIMENTS

Figure 1:
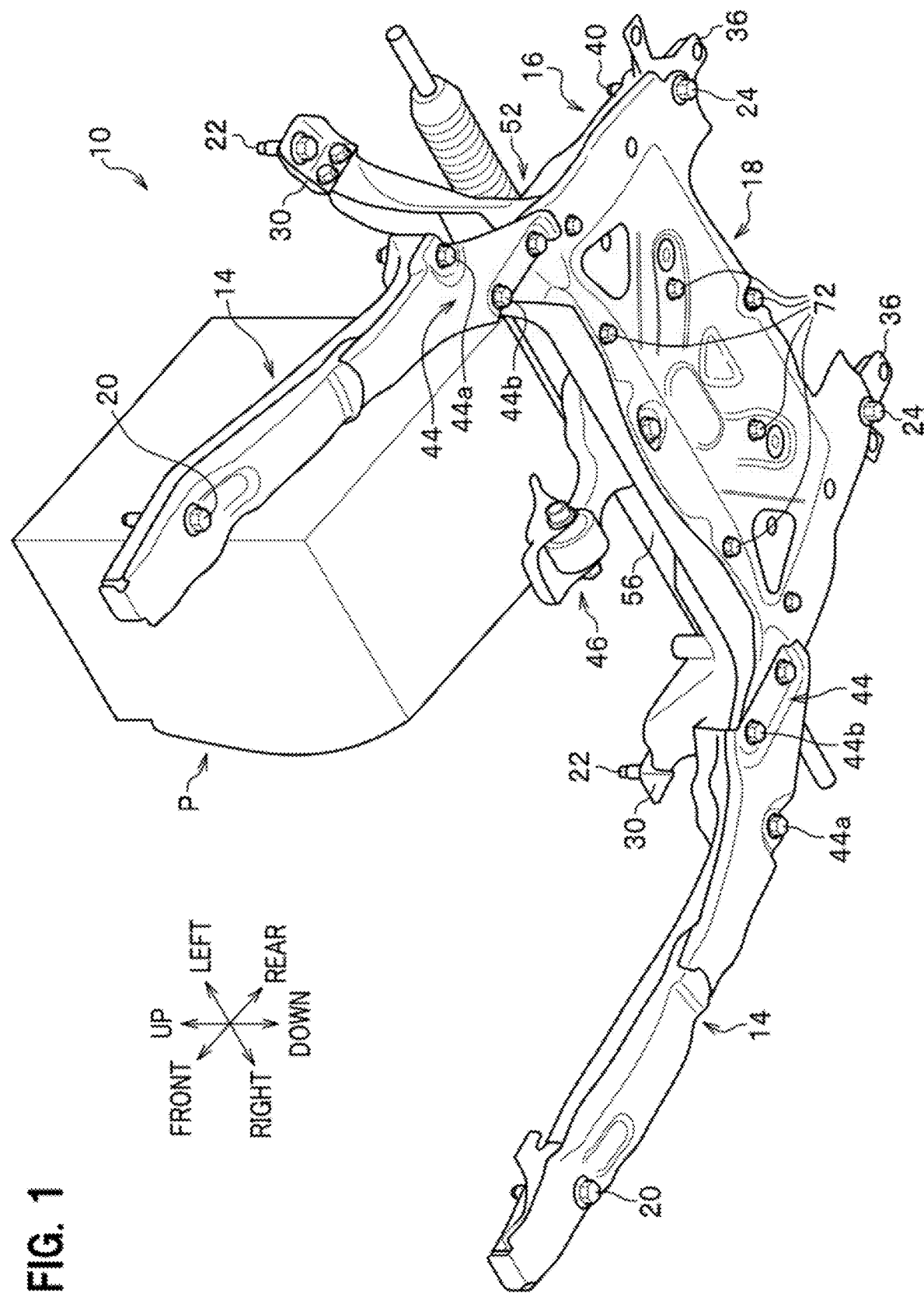
FIG. 1 is a perspective view of a vehicle forward part including a front subframe to which a front subframe structure according to an embodiment, of the present invention is applied, as seen from below ahead of the vehicle.

Next, an embodiment of the present invention will be described in detail with reference to the drawings.

In the drawings, "front-rear", "left-right", and "up-down" directions correspond to the vehicle front-rear direction, left-right direction (vehicle width direction), and vehicle up-down direction (vertically upward-downward direction), respectively.

As shown in FIG. 1, a front subframe 10 (hereinafter referred to simply as subframe 10) to which a subframe structure according to the embodiment of the present invention is applied is to be arranged in a forward part of a vehicle. This subframe 10 is attached to a lower side of a not-shown, left-right pair of front side frames extending in the vehicle front-rear direction.

Figure 13:
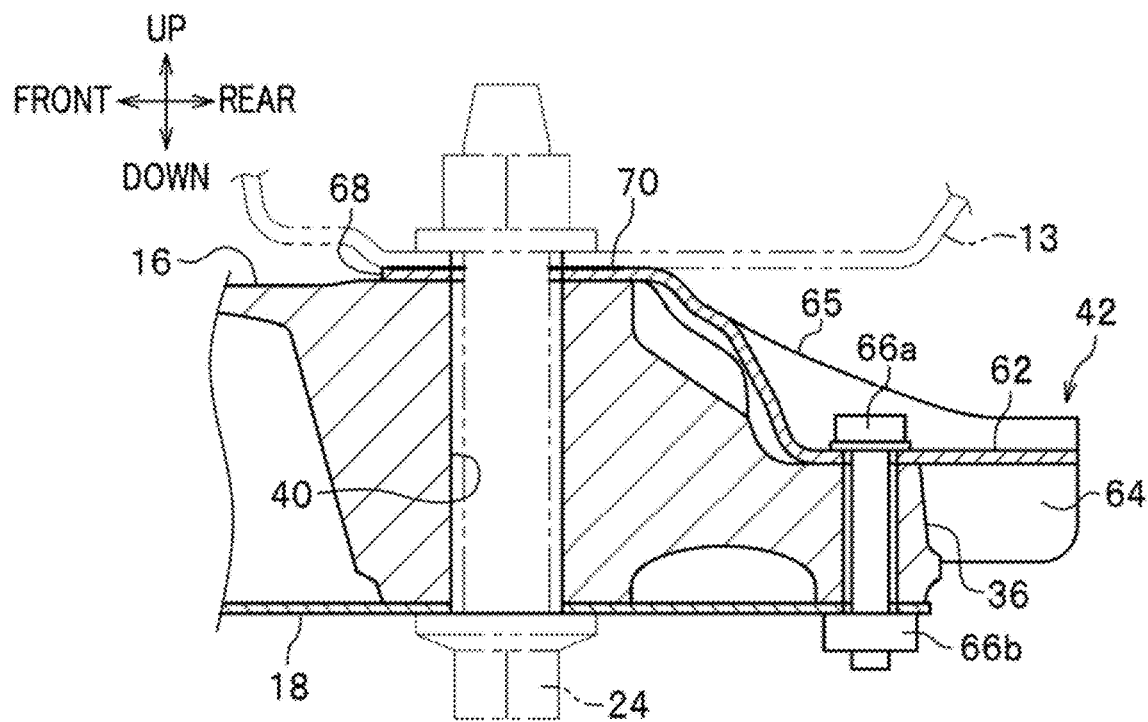
FIG. 13 is a cross-sectional view taken along line XIII-XIII in FIG. 12.

The subframe 10 supports front-wheel suspension devices not shown and supports a power plant P, e.g., a drive unit including a motor or an engine, via a mount mechanism not shown In other words, the subframe 10 is arranged below the power plant P (see FIGS. 1 and 2). The left-right pair of front side frames have rear end portions coupled to front end portions of a left-right pair of outriggers 13 (vehicle-body-side members) (see FIG. 13).

Figure 3:
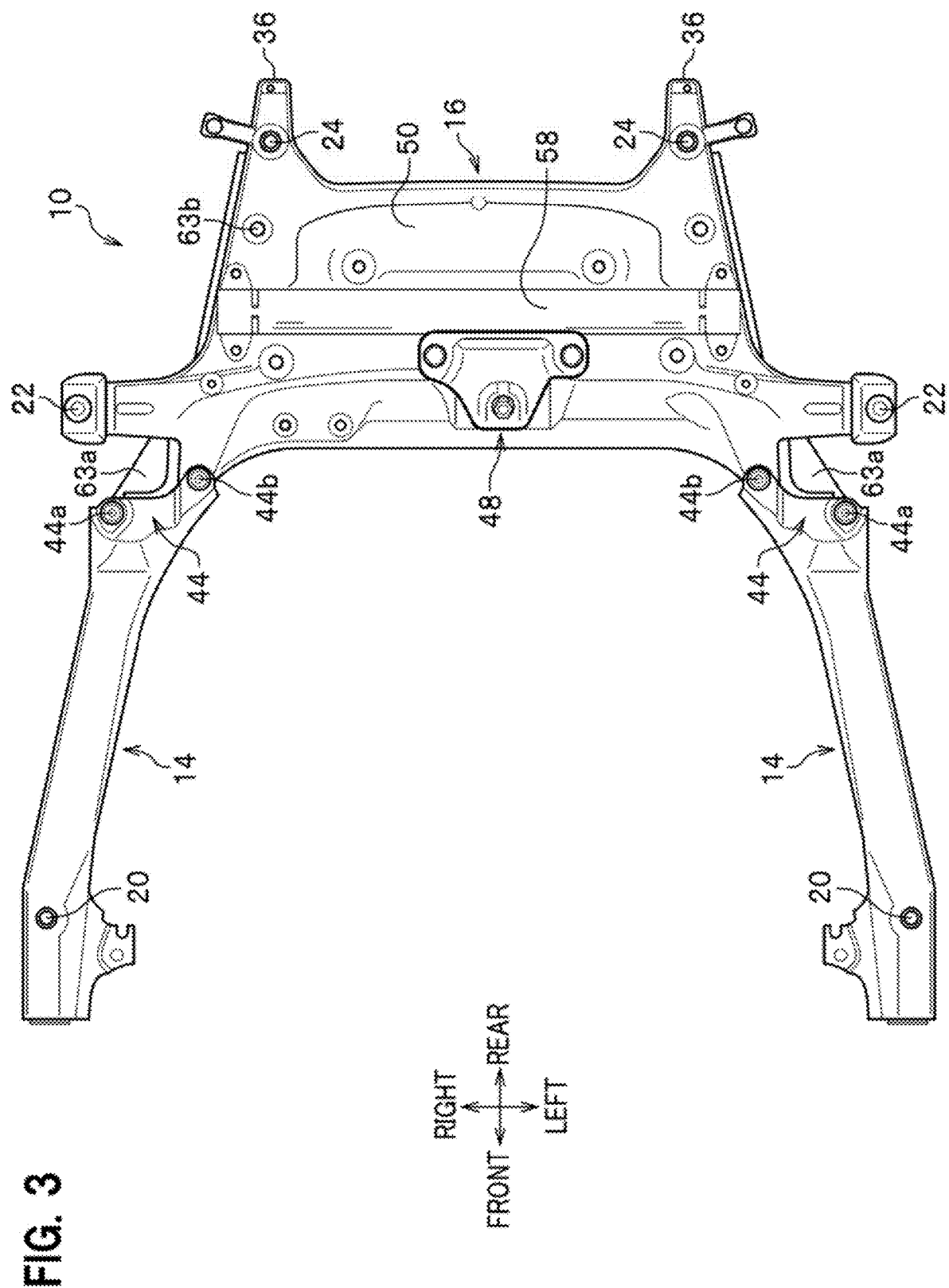
FIG. 3 is a plan view of the front subframe in a state in which a power plant and an electric power steering device and the like are removed from the vehicle forward port shown in FIG. 2.

As shown in FIG. 3, the subframe 10 has a left-right pair of extension members 14, a rear member 16, and a reinforcement bracket 18. The subframe 10 includes a plurality of vehicle body connection parts to be respectively connected to a plurality of vehicle-body-side members by using bolts and nuts. The plurality of vehicle body connection parts is constituted by a left-right pair of front vehicle body connection parts 20, a left-right pair of mid vehicle body connection parts 22, and a left-right pair of rear vehicle body connection parts (body connection parts) 24.

The left-right pair of front vehicle body connection parts 20 include through-holes each of which is located in a forward part of a corresponding one of the left-right pair of extension members 14 and near the front end thereof and penetrates the corresponding one of the left-right pair of extension members 14 in the up-down direction. Each of the left-right pair of front vehicle body connection parts 20 is fixed to a vehicle-body-side member (e.g., bulkhead) by a nut and a bolt that penetrates the corresponding one of the through-holes and projects upward.

The left-right pair of mid vehicle body connection parts 22 include projected parts 30 that are located respectively at left and right, front, end portions of the rear member it and extend outward in the vehicle width direction and then project upward a predetermined length. Each of the projected part 30 has a through-hole penetrating in the up-down direction. A bolt penetrating this through-hole and projecting upward from the projected part 30 and a nut are used to fix the projected part 30 to a corresponding one of the front side frames.

Figure 2:
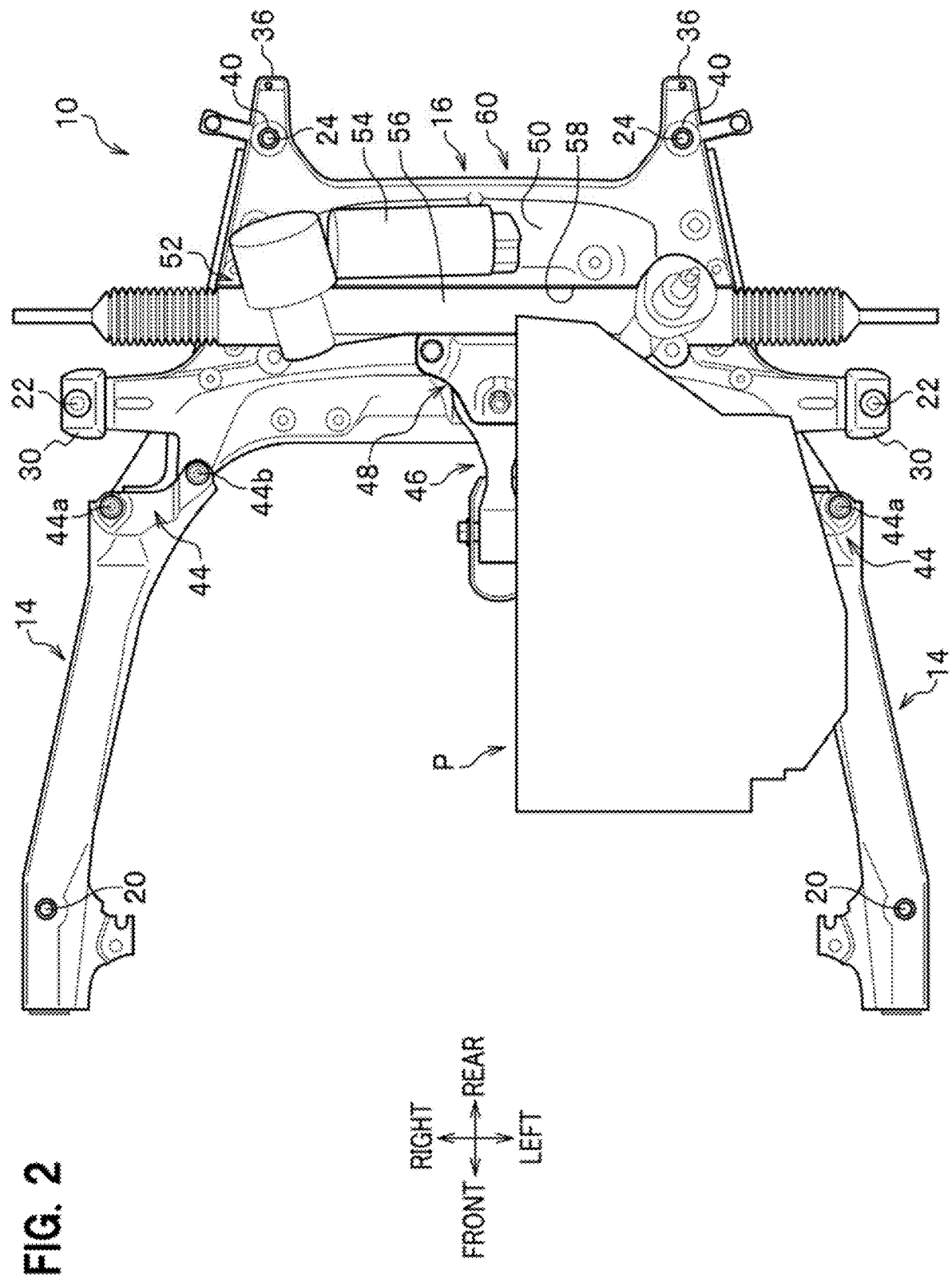
FIG. 2 is a plan view of the vehicle forward part including the front, subframe shown in FIG. 1.

The left-right pair or rear vehicle body connection parts 24 includes projected portions 36 that are located respectively at left and right rear end portions of the rear member 16 and extend rearward in the vehicle front-rear direction (see FIGS. 2 and 3). Each of the projected portions 36 has a through-hole penetrating in the up-down direction. A bolt 40 penetrating this through-hole and projecting upward from the projected portion 36, a not-shown nut, and the later-described extension bracket 42 are used to fix the projected portion 36 to a vehicle-body-side member (e.g., corresponding one of the left-right pair of outriggers 13) (see FIG. 13).

The left-right pair of extension members 14 extends substantially in the vehicle front-rear direction such that a distance between them slightly increases as they extend forward in the vehicle front-rear direction, in plan view. In other words, as shown in FIG. 3, a vehicle width direction distance between front end portions of the left-right pair of extension members 14 is larger than a vehicle width direction distance between rear end portions of the left-right pair of extension members 14. Each of the left-right pair of extension members 14 has a closed cross section having a rectangular shape in a cross section taken along a plane perpendicular to an axial direction of the extension member 14. The left-right pair of extension members 14 are formed of a steel material, for example.

The rear member 16 is located rearward of the left-right pair of extension members 14 and extends in the vehicle width direction. The rear member 16 is formed of a light metal such as aluminum or an aluminum alloy.

As shown in FIG. 3, the rear member 16 has a left-right pair of connecting parts 44 by which the rear end portions of the left-right pair of extension members 14 and left and right front end portions of the rear member 16 are connected respectively. Each of the connecting ports 44 is constituted by an outer connecting part 44a and an inner connecting part 44b. The outer connecting part 44a is located on a vehicle width direction outer side and the connection is made by a bolt and a nut. The inner connecting part 44b is located on a vehicle width direction inner side, which faces the power plant room in which the power plant P is installed, and the connection is made by a bolt and a nut. It should be noted that, alternatively, the pair of left-right pair of extension members 14 and the rear member 16 may be joined by Joining means like welding.

Figure 4:
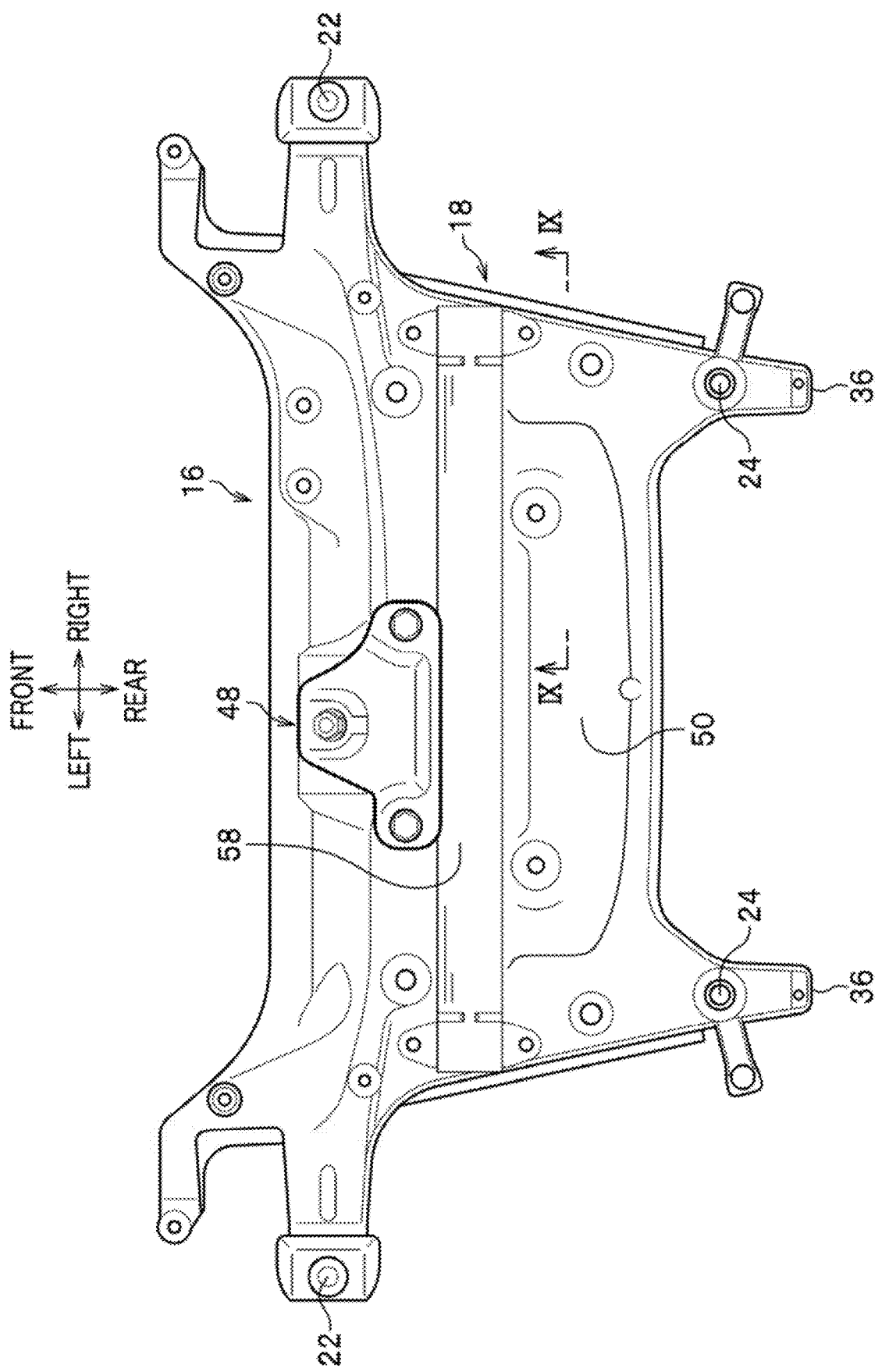
FIG. 4 is an enlarged plan view of a rear member of the front subframe shown in FIG. 3.

As shown in FIG. 4, a torque rod attachment part 48, to which a torque rod 46 is to be attached, is disposed on a front end portion of the rear member 16, which front end portion is located centrally with respect to a vehicle width direction length of the rear member 16. The torque rod attachment part 48 has a substantially triangular shape in plan view and is joined to an upper face of the rear member 16. The torque rod 46 has one side attached to the torque rod attachment part 48 and another side coupled to the power plant P. By coupling the subframe 10 via the torque rod 46 to the power plant P, it is possible to reduce the vibration or the like generated by the power plant P and thereby improve the quietness.

Figure 7:
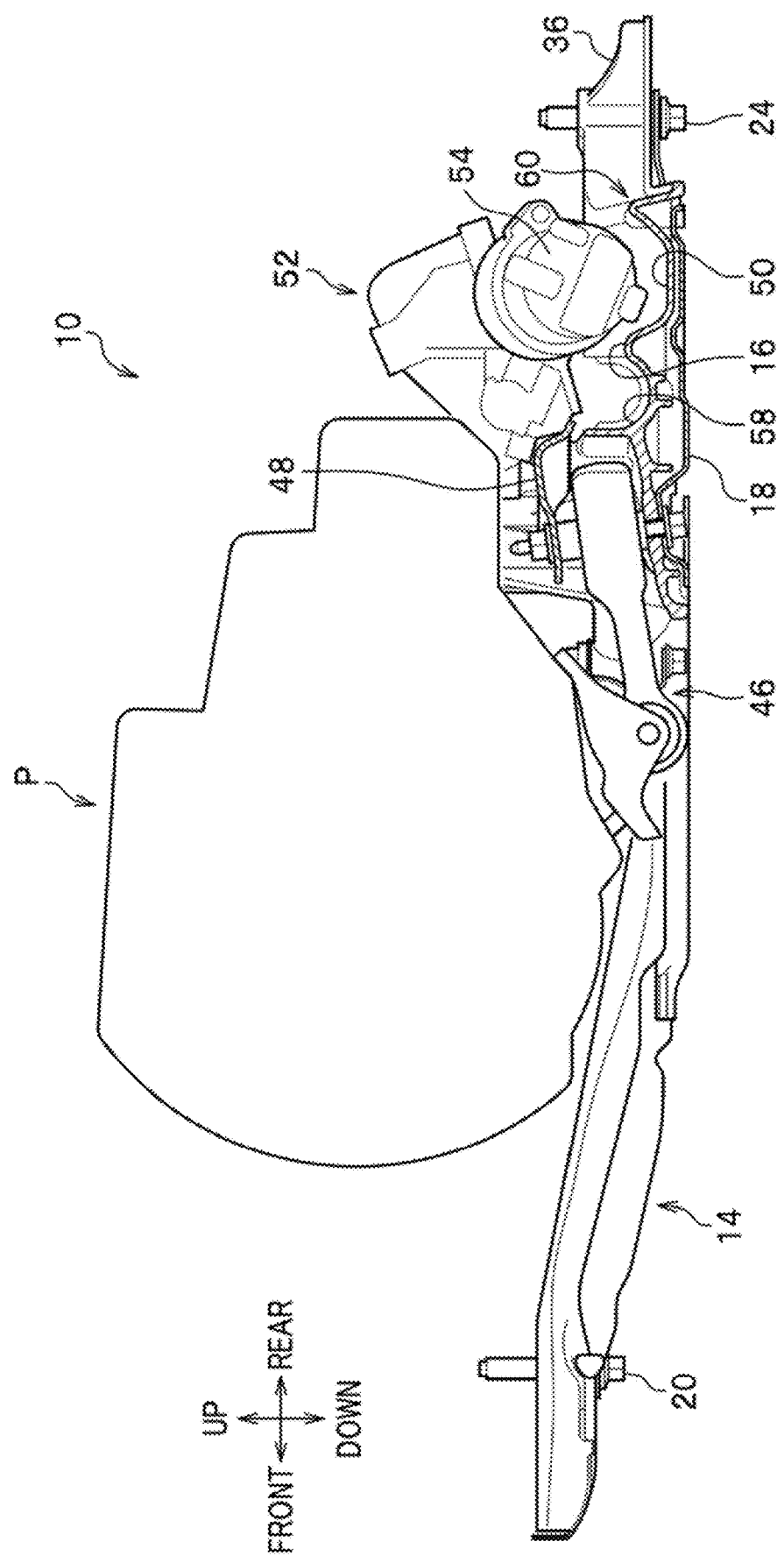
FIG. 7 is a partially-broken side view of the front subframe shown in FIG. 3.

As shown in FIG. 4, the upper race of the rear end portion of the rear member 16 has a motor placement recess (recessed portion) 50 that is recessed downward. This motor placement, recess 50 has a substantially arc shape in a cross section taken in a vertical plane extending in the vehicle front-rear direction (see FIGS. 7 and 8) and has an elongated belt-like shape extending in the vehicle width direction in plan view (see FIG. 4). At least a portion of a motor 54 of an electric power steering device (steering device) 52 mounted on the upper face of the rear number 16 is arranged in this motor placement recess 50 (see FIG. 2).

Figure 8:
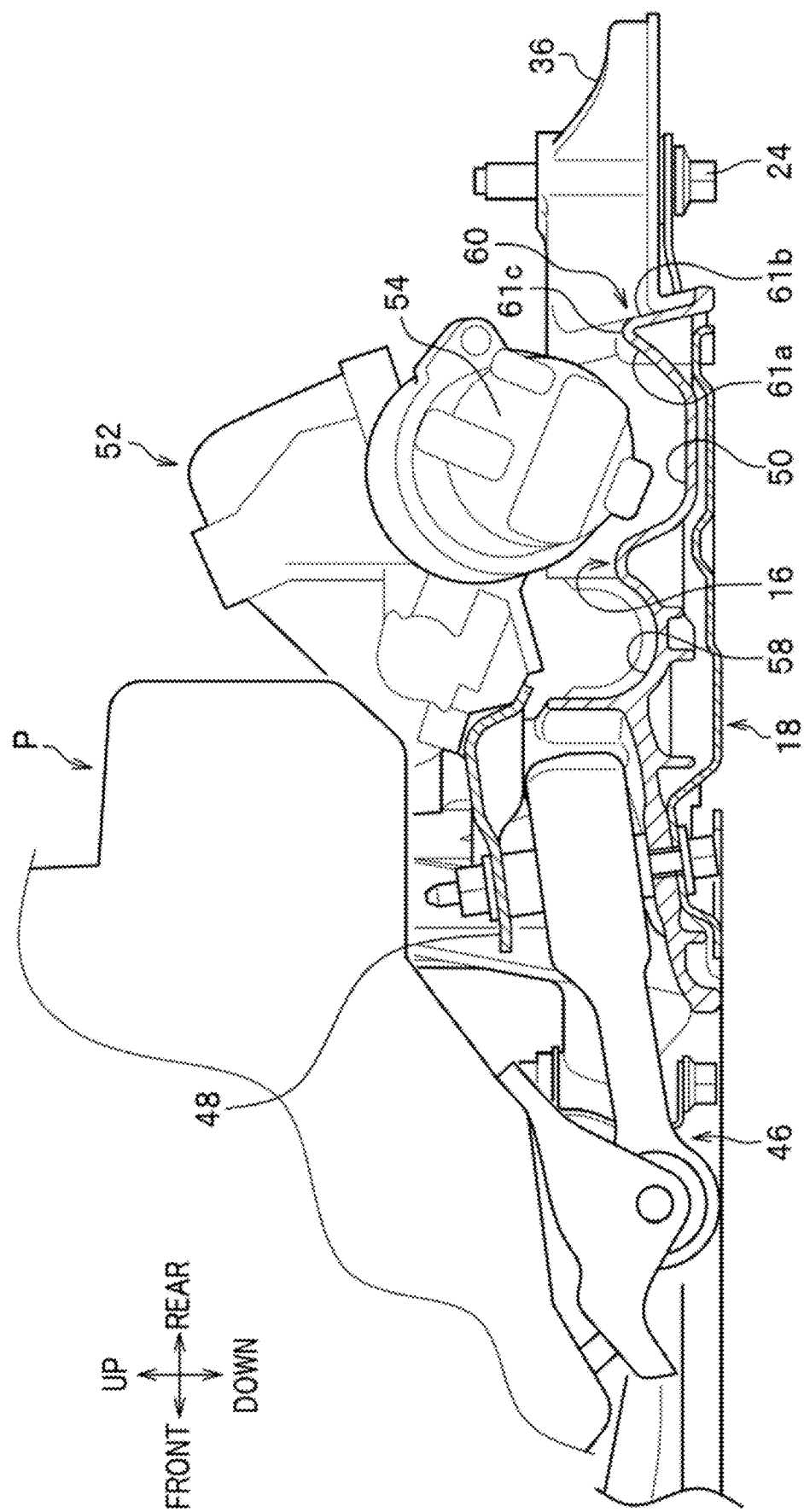
FIG. 8 is an enlarged, partially-broken side view of the front subframe.
Figure 9:
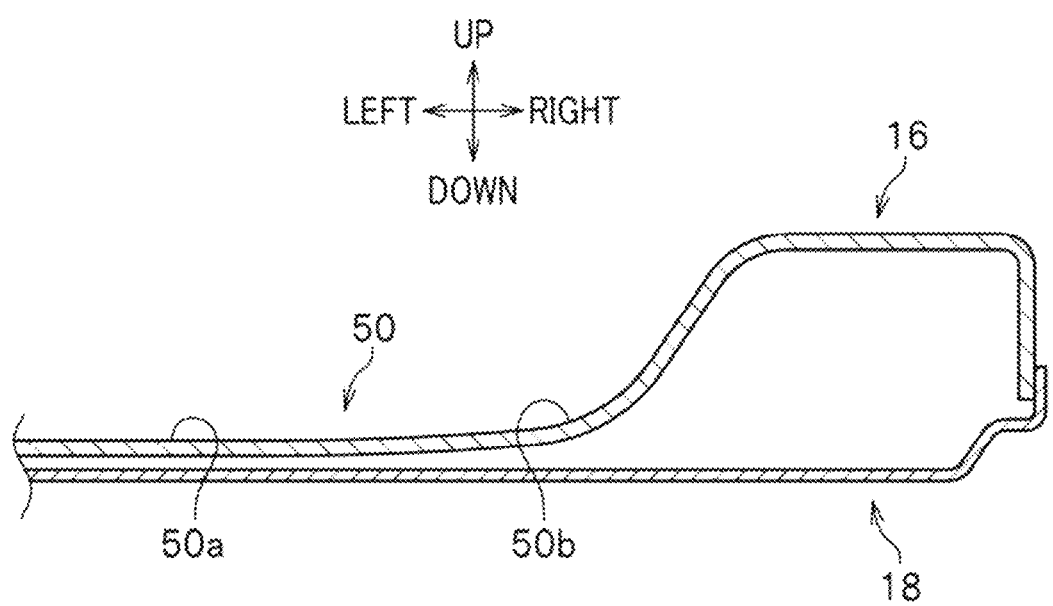
Figure 10:
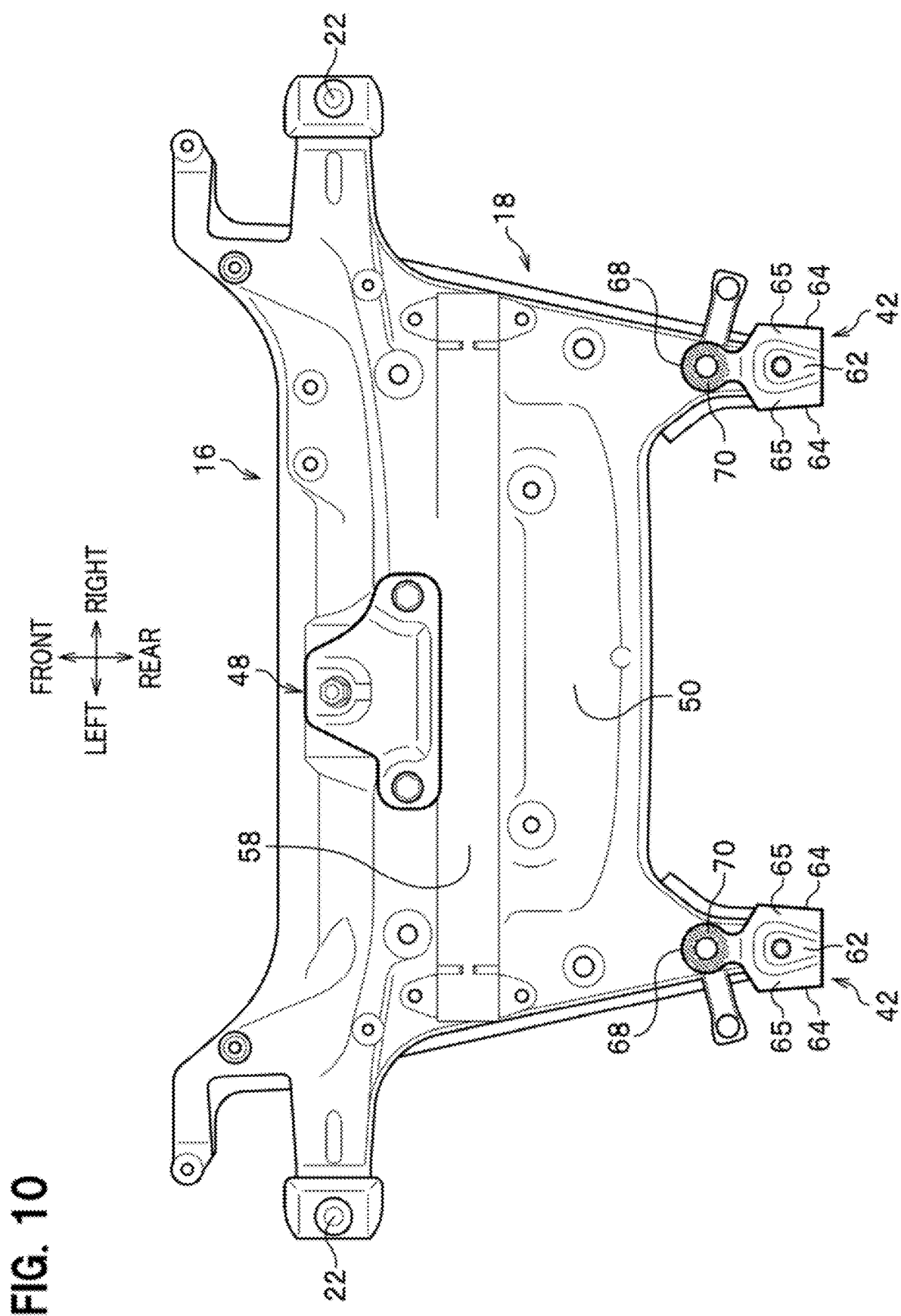
FIG. 10 is a plan view showing extension brackets arranged on rear end portions of the rear member.
Figure 11:
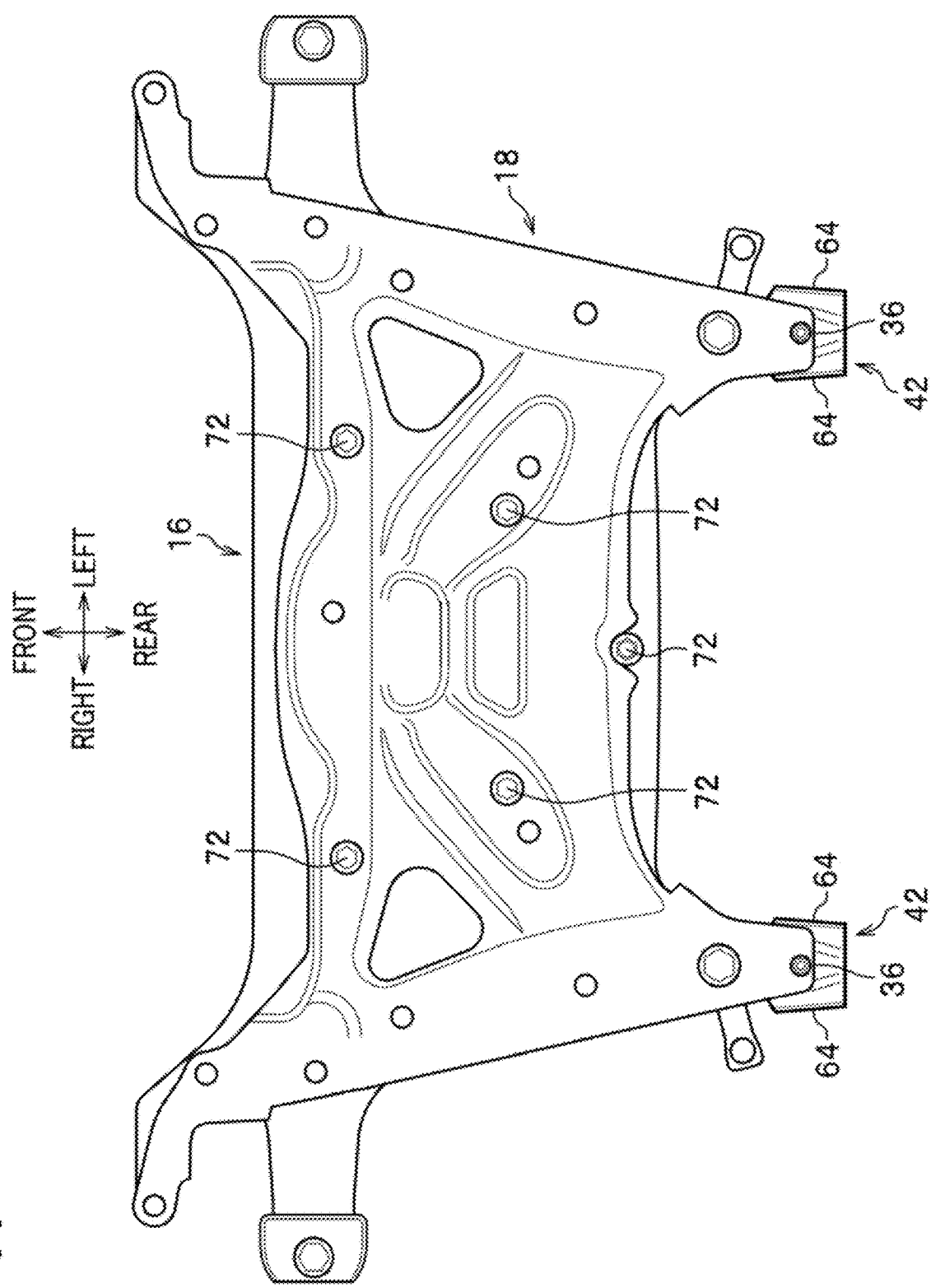
FIG. 11 is a bottom view of the parts shown in FIG. 10, as seen from below.
Figure 12:
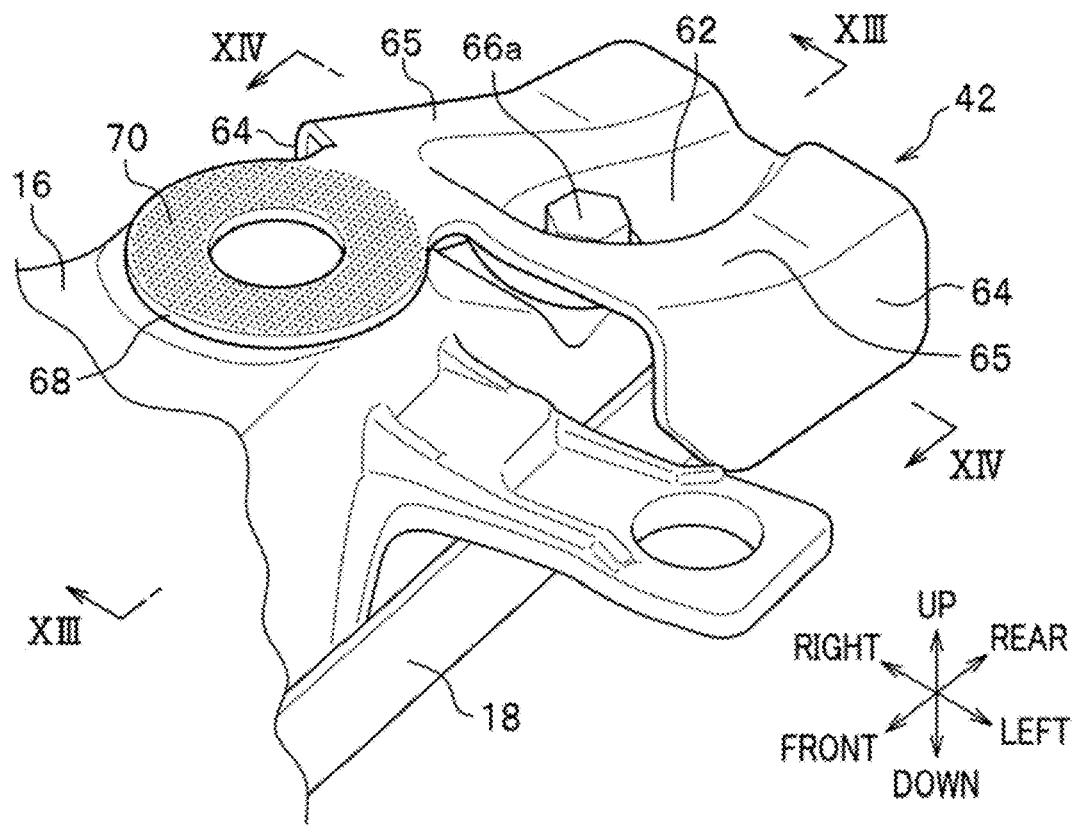
FIG. 12 is a partially-omitted, enlarged perspective view showing the extension bracket.

As shown in FIG. 9, motor placement recess 50 has an inner bottom wall 50a located at a lowermost position. The inner bottom wall 50a includes a sloped face 50b that rises upward as it extends from a vehicle width direction central portion thereof outward in the vehicle width direction The rear member 16 has a tie-rod placement recess 58 in which a tie rod 56 of the electric power steering device 52 is to be placed. The tie-rod placement recess 58 is located substantially centrally with respect to a vehicle front-rear direction length of the rear member 16 and between the torque rod attachment part 48 and the motor placement recess 50 (see FIGS. 7 and 8). The tie-rod placement recess 58 has a cross section with an arc shape having a smaller radius than the motor placement recess 50 and extends in the vehicle width direction. An innermost and lowermost bottom portion of the motor placement recess 50 is located at a lower position than an innermost and lowermost bottom portion of the tie-rod placement recess 58 (see FIG. 6).

As shown in FIG. 8, the rear member 16 has a vertical wall 60 located rearward of the motor placement recess 50 and extending substantially in an up-down direction and in the left-right direction. This vertical wall 60 is constituted by a front sloped wall 61a and a rear sloped wall 61b defining a ridgeline 61c therebetween. The front sloped wall 61a is contiguous with a rear sloped wall of the motor placement recess 50. The rear sloped wall 61b extends rearward and downward from the ridgeline 61c. The slope angle of the rear sloped wall 61b is larger than the slope angle of the front sloped wall 61a.

The rear member 16 includes forward suspension attachment portions 63a to which not-shown suspension arms are respectively attached, on vehicle width direction outer sides of the front end portion of the rear member 16 (see FIGS. 3 and 2). The rear member 16 includes rearward suspension attachment portions 63*b* to which not-shown suspension arms are respectively attached, on vehicle width direction outer sides of a rearward portion of the rear member 16 (see FIGS. 3 and 2).

As shown in FIGS. 10 to 14, the rear member 16 is provided with extension brackets 42 each of which covers a corresponding one of the rear vehicle body connection parts 24 such that the projected portion 36 thereof is covered by the extension bracket 42. The rear vehicle body connection parts 24 are coupled via these extension brackets 42 the to the vehicle-body-side members (outriggers 13) (see FIG. 13). The extension brackets 42 each have a substantially M shape (see FIG. 14) as seen from the rear of the vehicle (see FIG. 14). Each of the extension brackets 42 has an upper central portion in which a bead 62 defining a recess recessed downward is formed (see FIG. 12). This bead 62 extends from an intermediate portion of the extension bracket 42 to a rear end thereof in plan view. The extension bracket 42 has sloped surfaces 65 each sloped downward toward the rear of the vehicle, on the left and right sides of the bead 62 (see FIGS. 10, 12, and 13).

Figure 14:
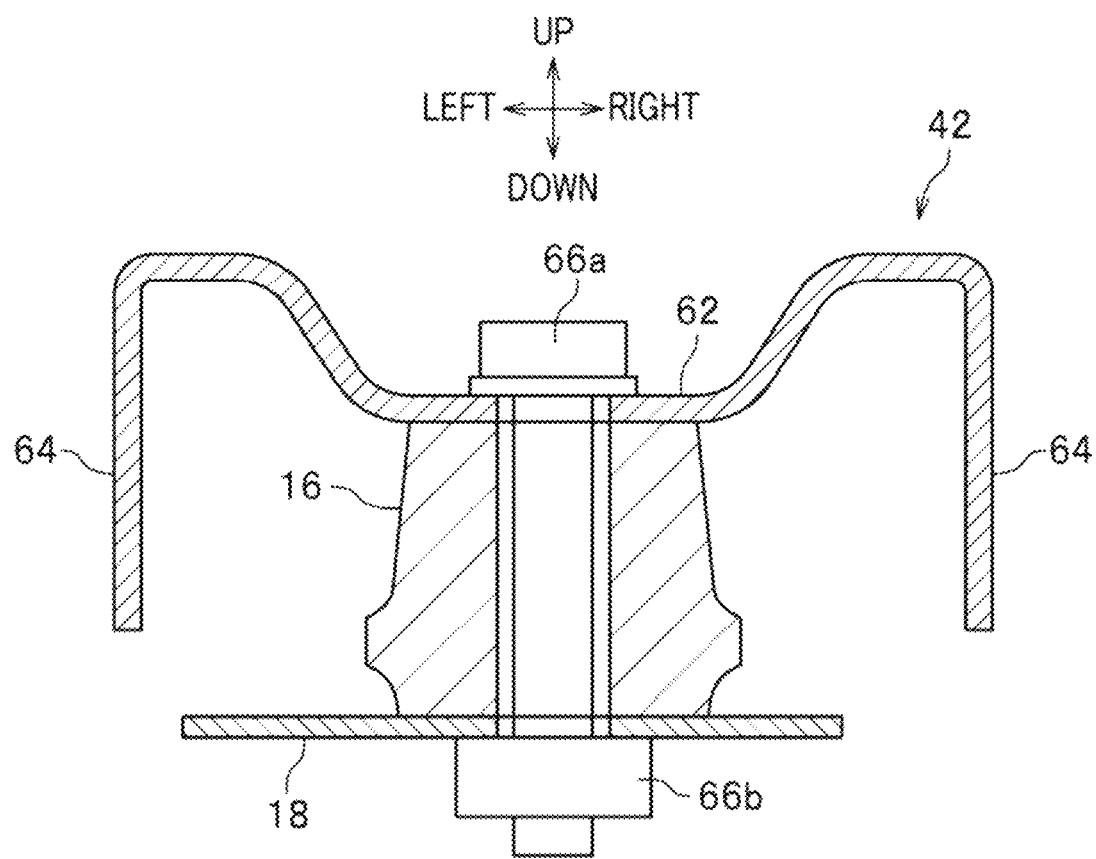
FIG. 14 is a cross-sectional view taken along line XIV-XIV in FIG. 12.

As shown in FIG. 14, each extension bracket 42 has two vehicle width direction end portions from which a left-right pair of flanges 64 respectively extends downward. Each extension bracket 42 is connected via a bolt 66*a* and a nut 66*b* to the rear member 16 at a position located rearward of the corresponding rear vehicle body connection part 24 (see FIG. 13). Each extension bracket 42 has a flat plate portion 68 interposed between the corresponding rear vehicle body connection part 24 and the corresponding vehicle-body-side member (outrigger 13). This flat plate portion 68 has an annular body with a central hole in plan view and has an upper face on which a resin material or a resin film 70 (see the dotted pattern in FIGS. 12 and 10) is coated.

Figure 5:
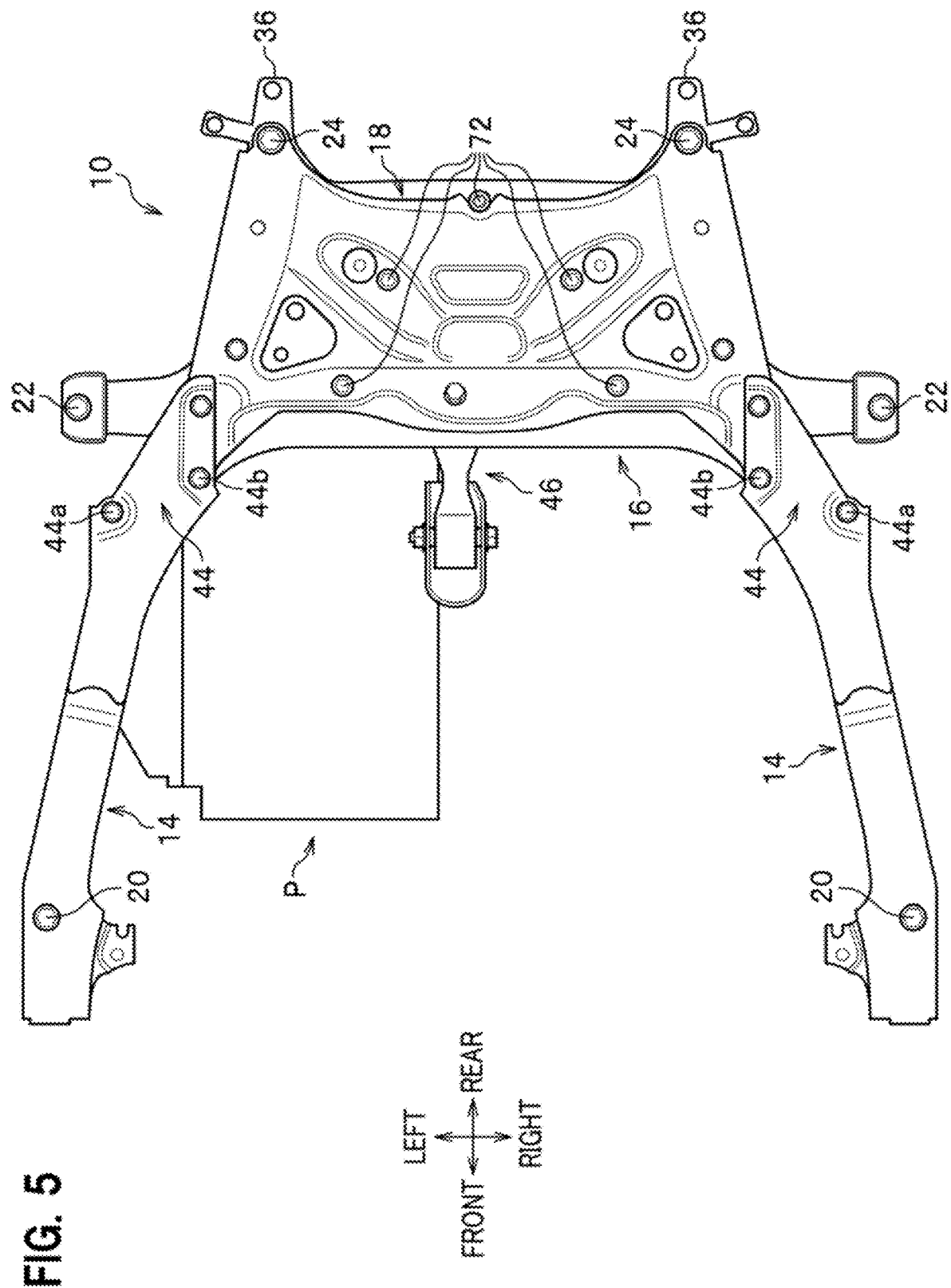
FIG. 5 is a bottom view of the front subframe shown in FIG. 2.
Figure 6:
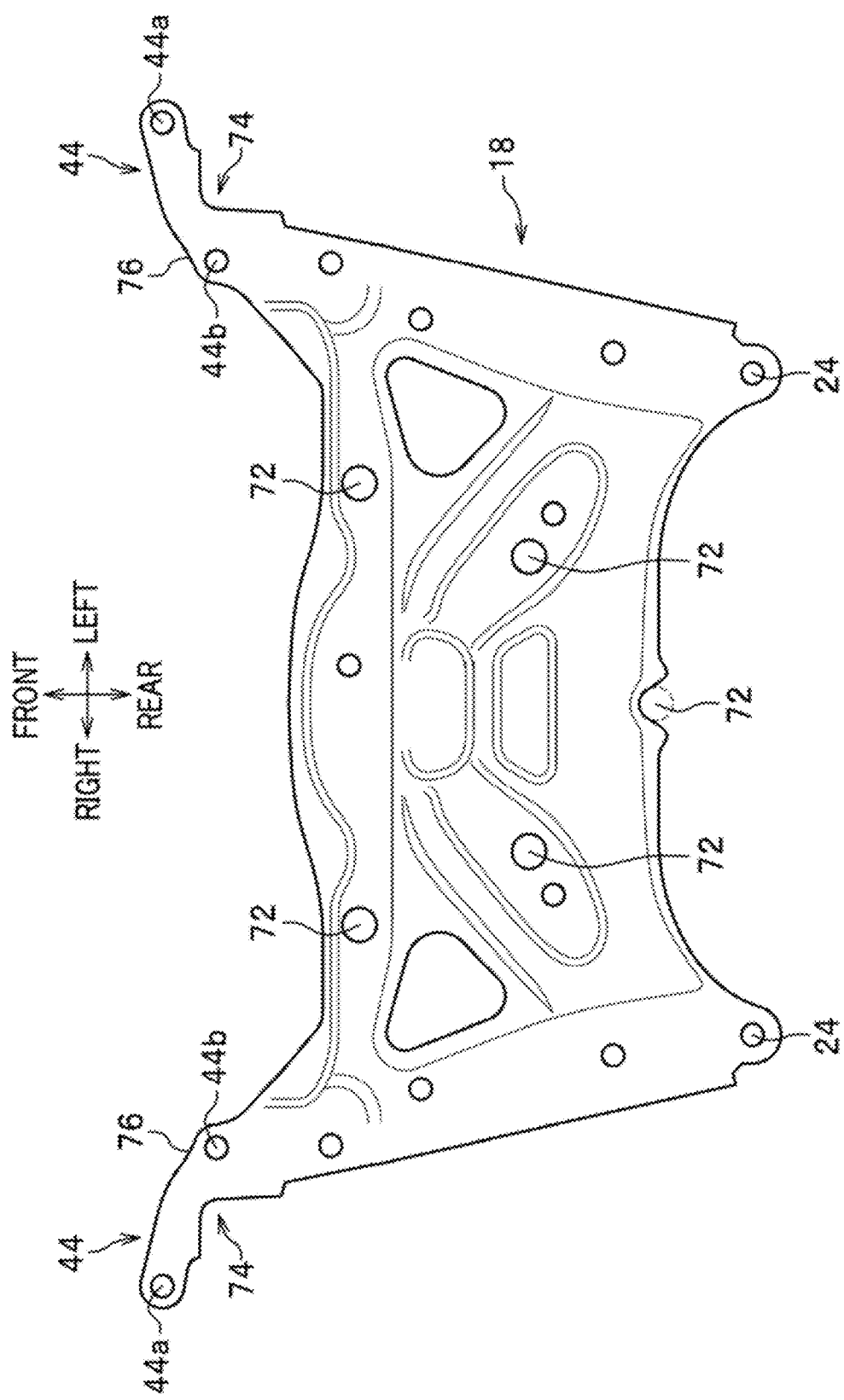
FIG. 6 is a bottom view of a reinforcement bracket.

As shown in FIGS. 5 and 6, the reinforcement bracket 18 is stacked (superimposed) on the lower face side of the rear member 16 in the up-down direction. The reinforcement bracket 18 has a plurality of intermediate fastening points (intermediate joining points) 72 through which the reinforcement bracket 18 is fastened to the rear member 16 by bolts. In the present embodiment, an example of 5 intermediate fastening points 72 is presented. The plurality of intermediate fastening points 72 are arranged such that they form a V-shape whose apex is oriented toward the rear of the vehicle and is located at a vehicle width direction central position of a rear portion of the reinforcement bracket 18, in bottom view (see FIGS. 6 and 5). It should be noted that, alternatively, the intermediate fastening points 72 may be connection points through which the reinforcement bracket 18 and the rear member 16 are integrally joined, for example, by joining means like spot welding without using bolts.

The reinforcement bracket 18 includes a left-right pair of extension portions 74 respectively located at a left-right pair of front end portions of the reinforcement bracket 18 and extending outward in the vehicle width direction. Each extension portion 74 extends to a corresponding one of the connecting parts 44 by which the rear end portions of the left-right pair of extension members 14 are respectively connected to the left and right front end portions of the rear member 16.

As shown in FIG. 6, each extension portion 74 is fastened by the corresponding connecting part 44 (outer connecting part 44*a*, inner connecting part 44*b*) to the corresponding one of the left-right pair of extension members 14 and the rear member 16 together to be connected to a vehicle-body-side member. A left-right pair of rear end portions of the reinforcement bracket 18 are fastened to the rear member 16 by the left-right pair or rear vehicle body connection parts 24 and are thereby connected to vehicle-body-side members. As such, the periphery of the reinforcement bracket 42 is fixed to the vehicle-body-side members.

Each extension portion 74 has a curved portion 76 which curves from a vehicle width direction inner side toward a vehicle width direction outer side. The curved portion 76 has a width that decreases as the curved portion 76 extends outward in the vehicle width direction in bottom view (see FIG. 6).

The front subframe 10, to which the subframe structure according to the present embodiment is applied, is basically structured as described above. Next, a description will be given of the operational effects of the present embodiment.

According to the present embodiment, the rear member 16 has a rear end portion in which the motor placement recess (recessed portion) 50 recessed downward is formed. At least a portion of the motor 54 of the electric power steering device (steering device) 52 mounted on the upper face of the rear member 16 is arranged in this motor placement recess 50.

Forming the motor placement recess 50 in the rear end portion of the rear member 16 according to the present embodiment makes it possible for a plurality of vehicle types to commonly use the subframe 10 irrespective of whether the vehicle is four-wheel drive or two-wheel drive.

According to the present embodiment, as the placement position of motor 54 of the electric power steering device 52 is set lower than that of conventional structures, it is possible to provide a space above the motor 54. With this, in the case of a four-wheel drive vehicle according to the present embodiment, the transfer extending from the transmission can be configured to pass through a point above the electric power steering device 52 (in the upper space above the motor 54). In addition, in the case of a two-wheel drive vehicle according to the present embodiment, the electric power steering device 52 can be arranged at the same position as that of a four-wheel drive vehicle because there is no transfer. According to the present embodiment, the structure of a subframe 10 to be mounted on a four-wheel drive vehicle and the structure of a subframe 10 to be mounted on a two-wheel drive vehicle can be the same (common). Therefore, the structure of the subframe 10 eliminates the need of preparing subframes separately for four-wheel drive vehicles and for two-wheel drive vehicles and thus lower the manufacturing cost.

According to the present embodiment, the torque rod attachment part 48, to which the torque rod 46 is to be attached, is disposed on the rear member 16 at a front end portion thereof located centrally with respect to the vehicle width direction length of the rear member 16. As a result, according to the present embodiment, the transfer of a four-wheel drive vehicle can be configured to pass through a position above the electric power steering device 52. Therefore, the present embodiment can provide a space extending in the vehicle width direction below the transfer, i.e., on a front end portion side of the rear member 16 and at a portion thereof located centrally with respect to the vehicle width direction length of the rear member 16. As a result, with the present embodiment, the torque rod 46, which is conventionally located on the left or right side with respect to the vehicle width direction length of the rear member 16, can be arranged in the space located centrally with respect to the vehicle width direction length of the rear member 16. As a result, with the present embodiment, the torque rod attachment part 48 can be attached to the rear member 16 at a front end portion thereof located centrally with respect to the vehicle width direction length of the rear member 16.

Moreover, according to the present embodiment, the rear member 16 has the vertical wall 60 located rearward of the motor placement recess 50 and extending substantially in up-down direction and in left-right direction. With the present embodiment, forming the vertical wall 60 at the position rearward of the motor placement recess 50 makes it possible to impart desirable support rigidity and support strength to the rear member 16 against a lateral load applied from the electric power steering device 52.

Moreover, according to the present embodiment, the reinforcement bracket 18 is arranged on the lower face side of the rear member 16. The reinforcement bracket 18 has the plurality of intermediate fastening points (intermediate joining points) 72, through which the reinforcement bracket 18 is fastened to the rear member 16 by bolts. According to the present embodiment, the reinforcement bracket 18 and the rear member 16 are fastened together at a vehicle width direction middle portion thereof via the plurality of intermediate fastening points 72. This structure suitably withstands, for example, a lateral lead transmitted inward in the vehicle width direction by a suspension arm not shown and a vertical load transmitted rearward in the vehicle front-rear direction from the torque rod 46 via the torque rod attachment part 48.

Moreover, the subframe structure according to the present embodiment includes connecting parts 44 through which the rear end portions of the extension members 14 and the front end portion of the rear member 16 are connected. In addition, the reinforcement bracket 18 includes extension portions 74 respectively extending to the connecting parts 44. Each extension portion 74 has a curved portion 76 which curves from a vehicle width direction inner side toward a vehicle width direction outer side. The curved portion 76 has a width that decreases as the curved portion 76 extends outward in the vehicle width direction in bottom view.

With this structure of the present embodiment, the extension portions 74 of the reinforcement bracket 18 can restrain the deformation of the connecting parts 44 connecting the extension members 14 and the rear member 16 in the event when a frontal collision load and/or a lateral collision lead is applied. Moreover, according to the present embodiment, the extension portions 74 each have a curved configuration and have a curved portion 76 with a narrow width. This structure makes it possible to provide sufficient spaces for the suspension attachment portions 63a and to support a wide variety of suspension arms, thus improving the versatility.

Moreover, the rear member 16 according to the present embodiment has rear vehicle body connection parts 24, each of which is connected to a vehicle body at a rearward part of the rear member 16. The rear vehicle body connection parts 24 each include a projected portion 36 projecting rearward in the vehicle front-rear direction. Each of the extension brackets 42 covers the corresponding rear vehicle body connection part 24 including the corresponding projected portion 36. Each of the rear vehicle body connection parts 24 is connected via the corresponding extension bracket 42 to the vehicle body. Each extension bracket 42 has a substantially M shape as seen from behind the vehicle and has an upper central portion in which a bead 62 defining a recess recessed downward is formed. This bead 62 extends from an intermediate portion of the extension bracket 42 to a rear end thereof in plan view.

Forming the projected portions 36 each at a position located in a rearward part, of the rear member 16 according to the present embodiment makes it possible to cause the projected portions 36 to serve as an abutting face (contact face) against the vehicle body when a collision load is applied from the front of the vehicle and thereby cause the subframe 10 to fall off from the vehicle body. In addition, the structure suitably prevent the power plant P from entering the vehicle compartment.

Moreover, attaching the extension brackets 42 to the rear vehicle body connection parts 24 in accordance with the present embodiment makes it possible to cause the subframe 10 to reliably fall off when a collision load is applied even when the present embodiment is applied to different types of vehicle. That means wide variety of types of vehicles can use the same subframe 10.

Moreover, forming the bead 62 in each extension bracket 42 in accordance with the present embodiment enhances the rigidity and strength of the extension bracket 42 itself.

Moreover, each of the extension brackets 42 according to the present embodiment has two vehicle width direction end portions from which a left-right pair of flanges 64 extends downward. This structure of the present embodiment restrains, when a collision load is applied, the deformation of the extension brackets 42 in the event of abutment of the extension bracket 42 with the vehicle body. In addition, the structure can prevent each extension bracket 42 from rotating about the corresponding bolt 66a in an assembly operation.

Moreover, each extension bracket 42 according to the present embodiment is connected via the corresponding bolt 66a to the rear member 16, at a position located rearward of the corresponding rear vehicle body connection part 24. This structure of the present embodiment makes it possible to, when a collision load is applied, prevent the deformation and/or disengagement of each extension bracket 42 in the event of abutment of the extension bracket 42 with the vehicle body.

Moreover, each extension bracket 42 includes a flat plate portion 68 interposed between the corresponding rear vehicle body connection part 24 and the vehicle body. This flat plate portion 68 has an upper face or which a resin material or a resin film 70 (see the dotted pattern in FIGS. 10 and 12) is coated. This structure of the present embodiment suitably prevent the subframe 10 from sliding laterally due to a load applied via a suspension arm.

What is claimed is:

1. A subframe structure comprising:
a left-right pair of extension members arranged below a power plant arranged in a forward part of a vehicle, the left-right pair of extension members each extending in a vehicle front-rear direction and each having a rear end portion; and
a rear member connected to the rear end portions of the pair of left-right extension members, the rear member extending in a vehicle width direction,
wherein the rear member has a rearward part in which a recessed portion recessed downward is formed,
wherein the rear member has an upper face on which a steering device is to be mounted and at least a portion of a motor of the steering device is to be placed in the recessed portion,
wherein the rear member has a lower face on which a reinforcement bracket is arranged, and wherein the reinforcement bracket has a plurality of intermediate joining points at which the reinforcement bracket is joined to the rear member.

2. The subframe structure according to claim 1, wherein a torque rod attachment part, to which a torque rod is to be attached, is disposed on a central portion of a forward part of the rear member, the central portion located centrally with respect to the vehicle width direction length of the rear member.

3. The subframe structure according to claim 1, wherein the rear member includes a vertical wall located rearward of the recessed portion and extending in an up-down direction and left-right direction.

4. The subframe structure according to claim 1, wherein the subframe structure further comprises connecting parts via which the rear end portions of the left-right pair of extension members and left-right pair of front end portions of the rear member are connected respectively,
wherein the reinforcement bracket includes extension portions extending respectively to the connecting parts, and
wherein each of the extension portions has a curved portion which curves from a vehicle width direction inner side toward a vehicle width direction outer side, the curved portion having a width that decreases as the curved portion extends outward in the vehicle width direction in bottom view.

5. A subframe structure comprising:
a left-right pair of extension members arranged below a power plant arranged in a forward part of a vehicle, the left-right pair of extension members each extending in a vehicle front-rear direction and each having a rear end portion; and
a rear member connected to the rear end portions of the pair of left-right extension members, the rear member extending in a vehicle width direction,
wherein the rear member has a rearward part in which a recessed portion recessed downward is formed,
wherein the rear member has an upper face on which a steering device is to be mounted and at least a portion of a motor of the steering device is to be placed in the recessed portion,
wherein the rear member comprises a body connection part located in a rear part of the rear member and connected to a vehicle body,
wherein the body connection part includes a projected portion projecting rearward in the vehicle front-rear direction,
wherein an extension bracket is attached to the body connection part and covers the body connection part such that the projected portion thereof is covered by the extension bracket,
wherein the body connection part is connected via the extension bracket to the vehicle body,
wherein the extension bracket has a substantially M shape as seen from behind the vehicle and has an upper central portion in which a bead defining a recess recessed downward is formed, and
wherein the bead extends from an intermediate portion of the extension bracket to a rear end thereof in plan view.

6. The subframe structure according to claim 5, wherein the extension bracket has two vehicle width direction end portions from which a left-right pair of flanges respectively extends downward.

7. The subframe structure according to claim 5, wherein the extension bracket is connected to the rear member at a position located rearward of the body connection part.

8. The subframe structure according to claim 5, wherein the extension bracket includes a flat plate portion to be interposed between the body connection part and the vehicle body, and
wherein the flat plate portion has an upper face on which a resin film is coated.

* * * * *